June 28, 1932. C. N. KOCH 1,864,742
COMBUSTION TURBINE AND METHOD OF BURNING FUEL
Filed June 15, 1923 8 Sheets-Sheet 1
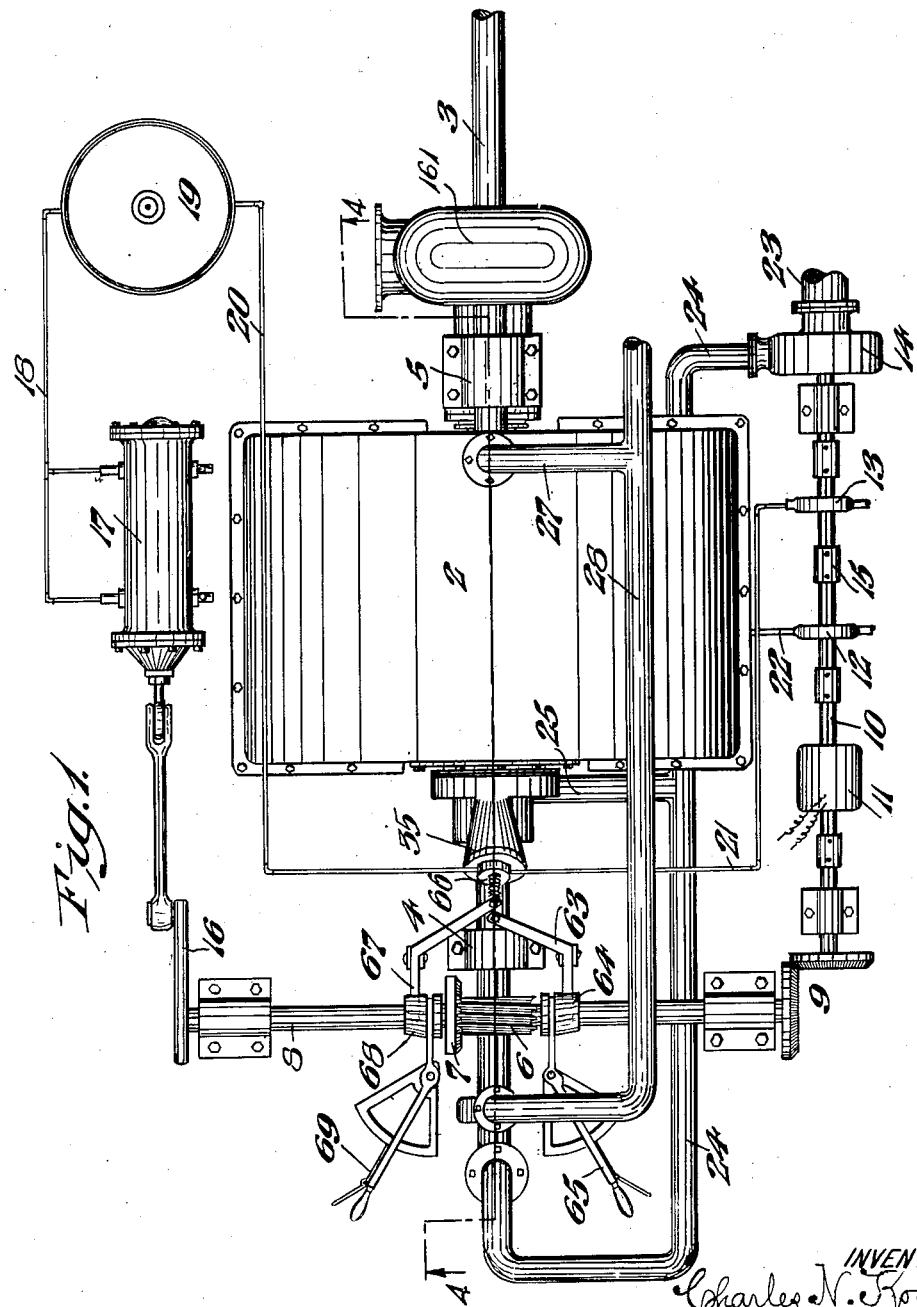

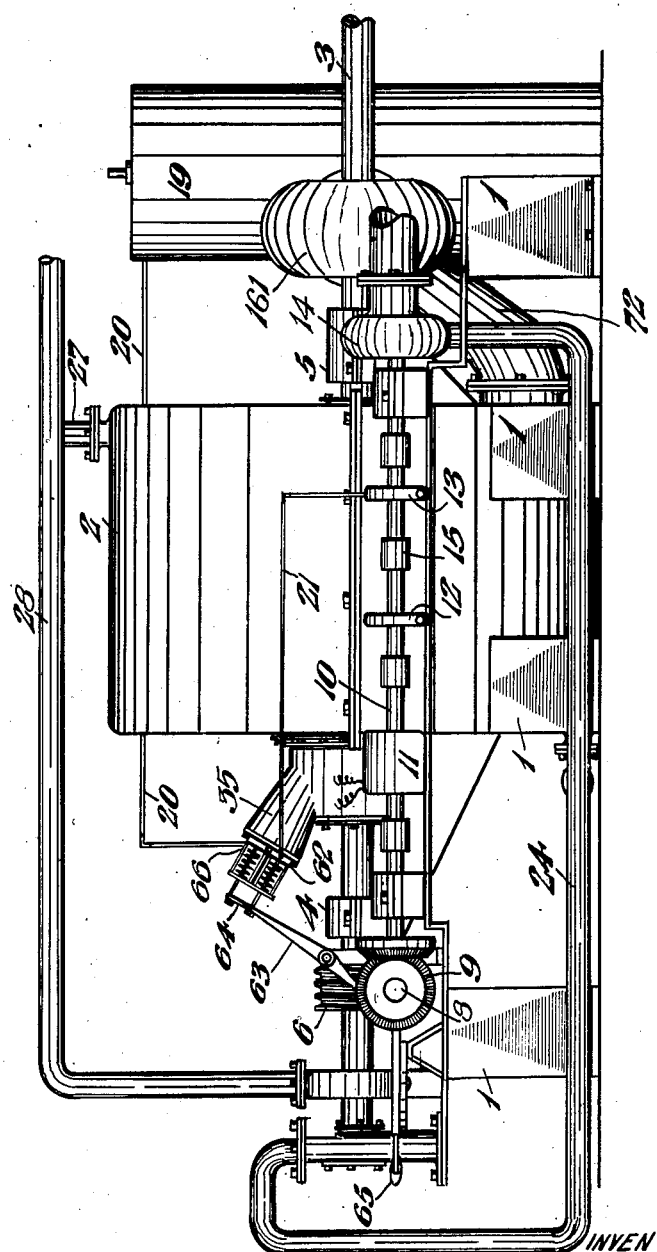

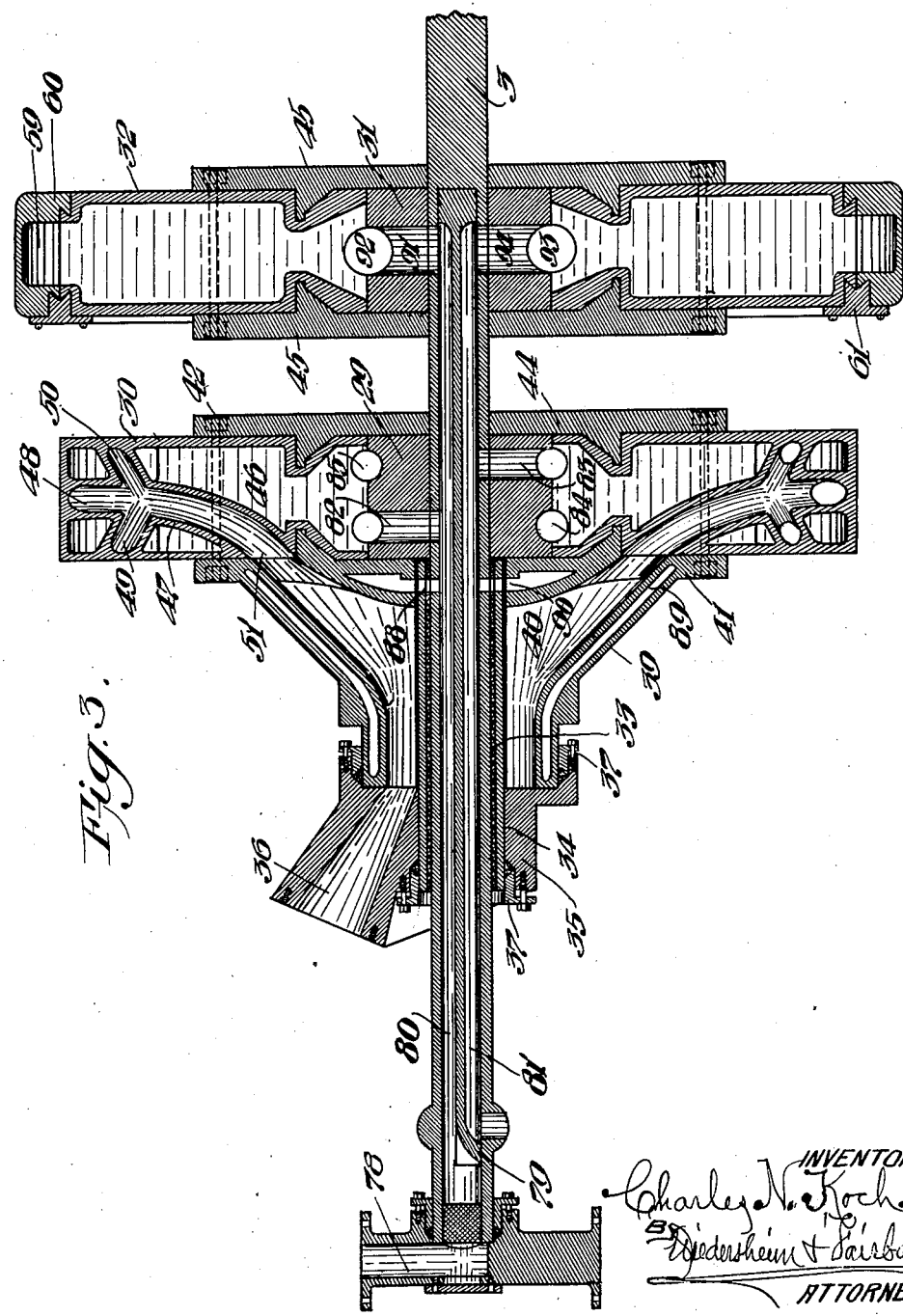

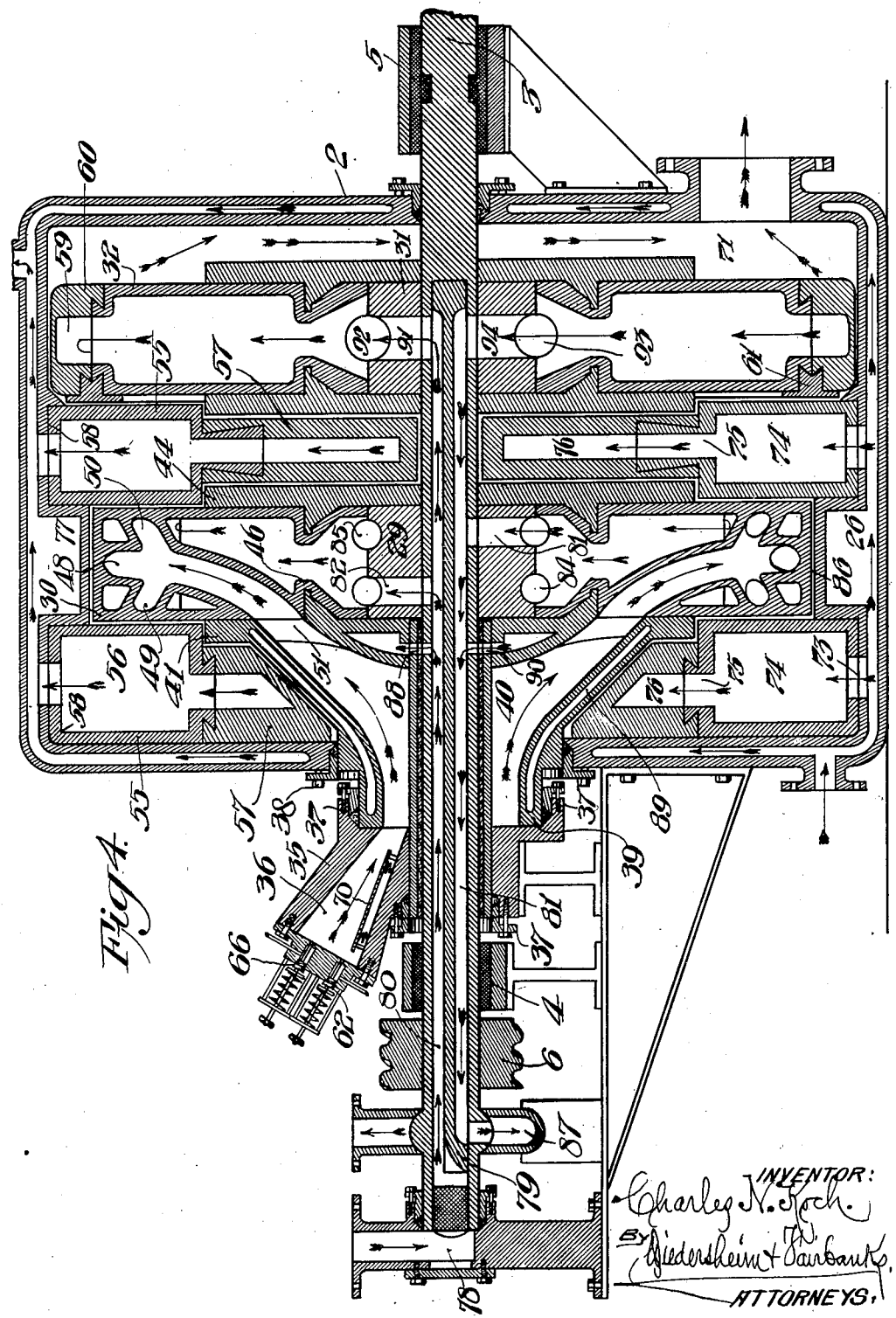

June 28, 1932. C. N. KOCH 1,864,742
COMBUSTION TURBINE AND METHOD OF BURNING FUEL
Filed June 15, 1923 8 Sheets-Sheet 5
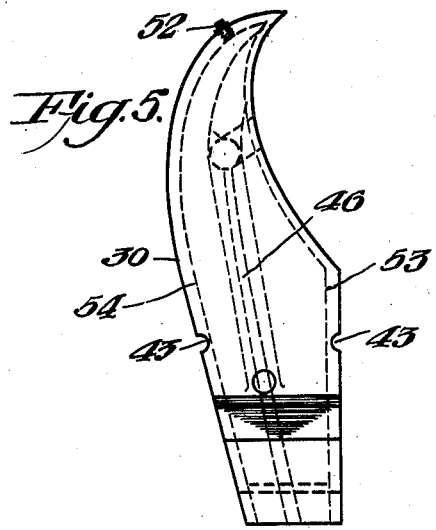
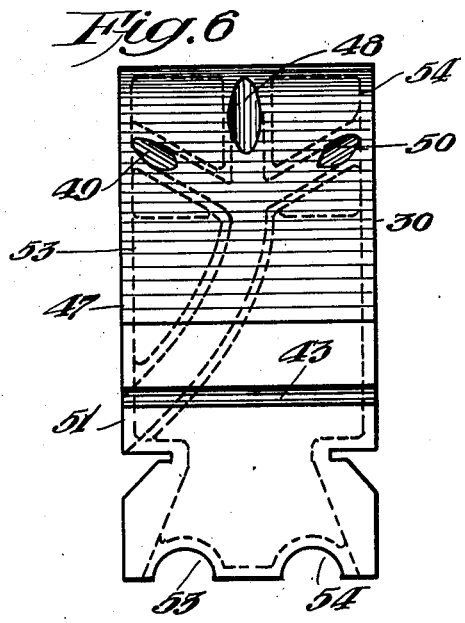
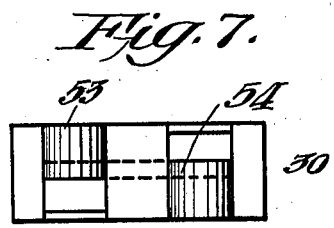

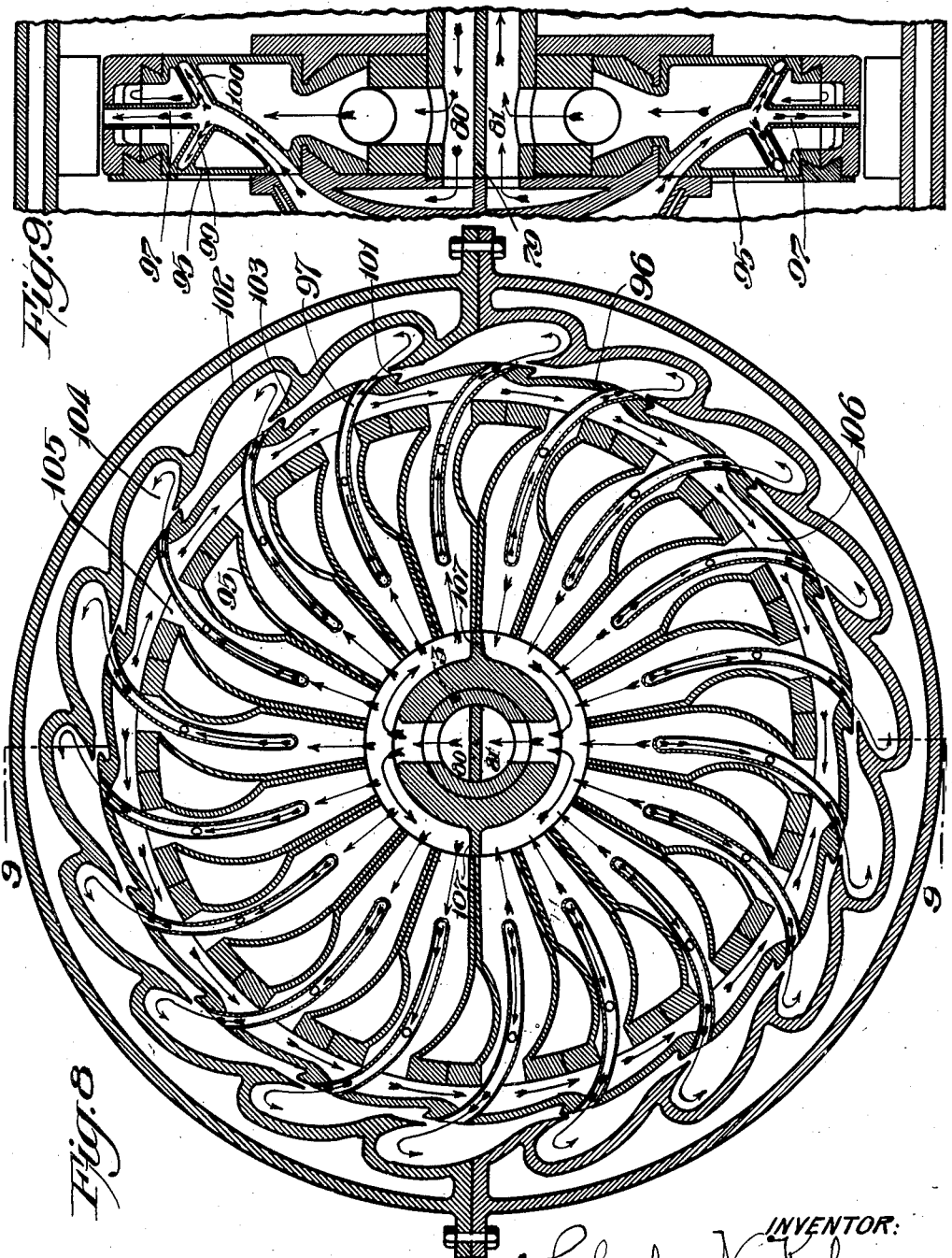

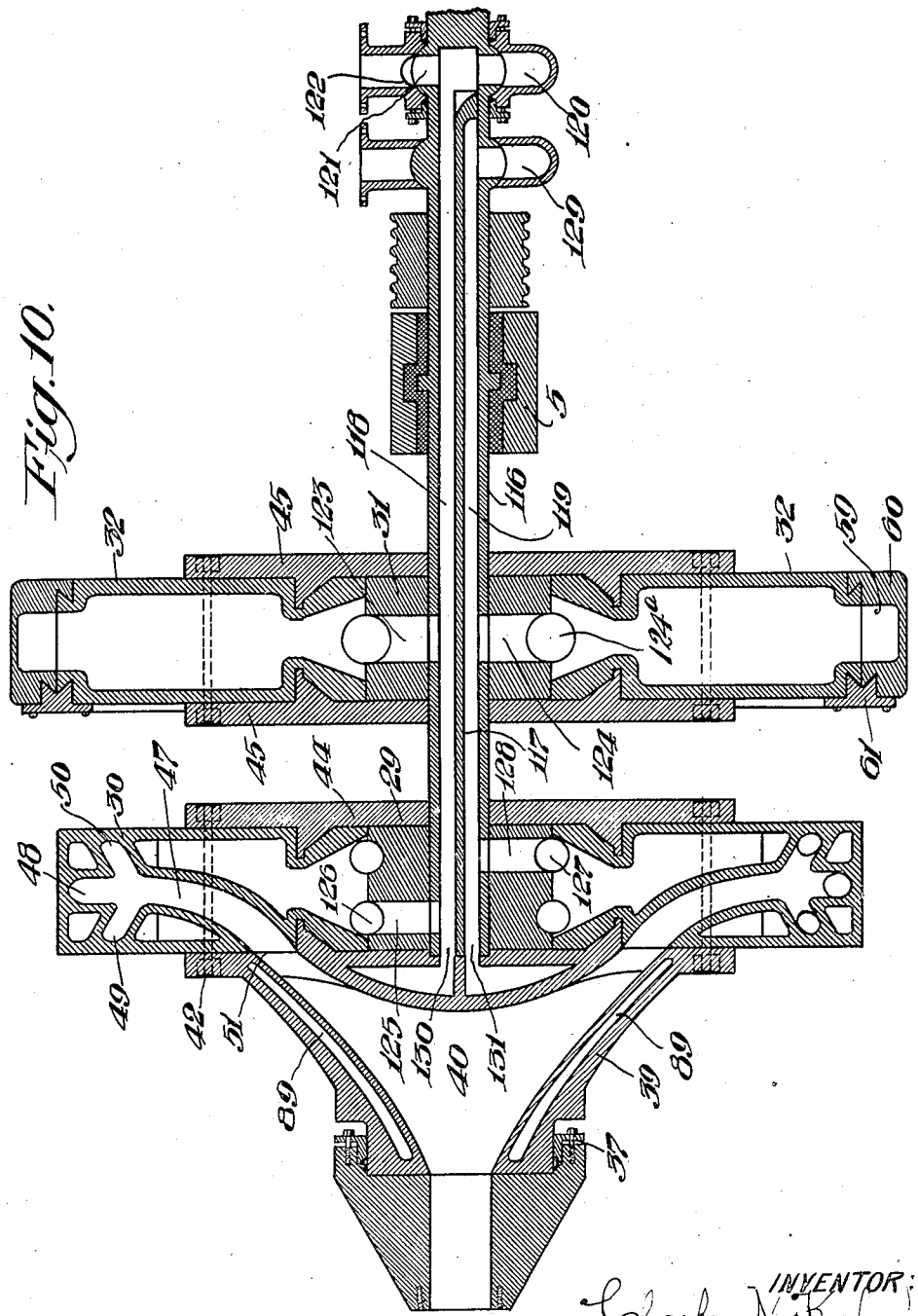

June 28, 1932. C. N. KOCH 1,864,742
COMBUSTION TURBINE AND METHOD OF BURNING FUEL
Filed June 15, 1923 8 Sheets-Sheet 8
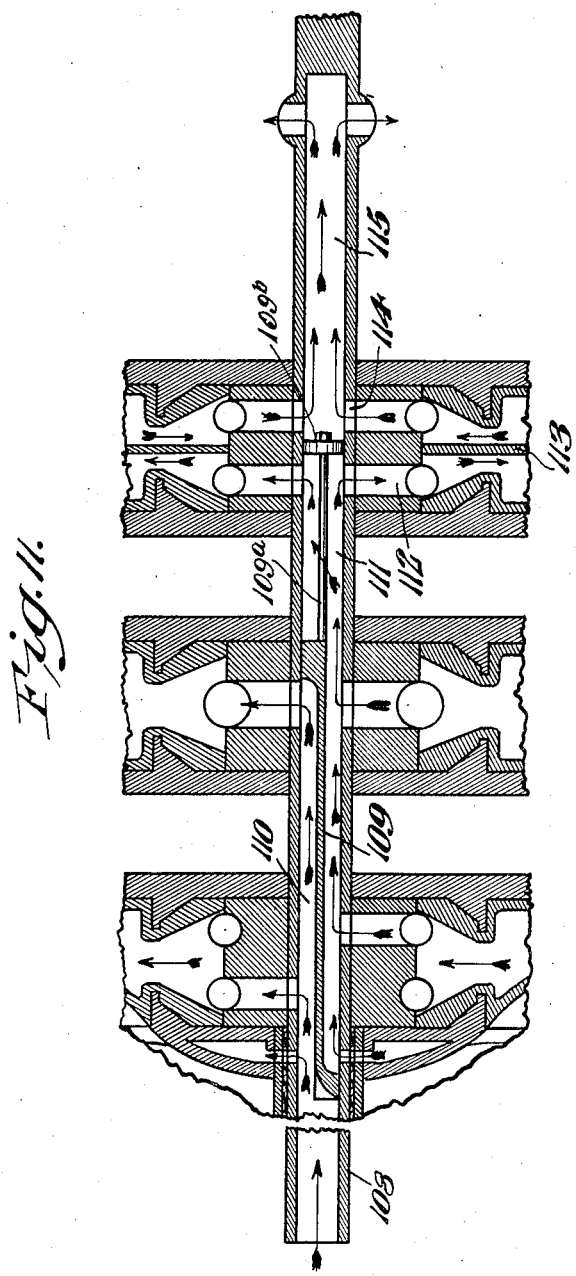

Patented June 28, 1932

1,864,742

UNITED STATES PATENT OFFICE

CHARLES N. KOCH, OF KANE, PENNSYLVANIA

COMBUSTION TURBINE AND METHOD OF BURNING FUEL

Application filed June 15, 1923. Serial No. 645,710.

(GRANTED UNDER THE ACT OF MARCH 3, 1883, AS AMENDED APRIL 30, 1928; 370 O. G. 757)

In a co-pending application Serial Number 645,709, filed June 15, 1923, I have described and generically claimed a novel method of and apparatus for creating an incandescent motive fluid and for effecting its continuous introduction under normal working conditions and under a constant pressure into the combustion space which is in free communication with the working space of the turbine.

In my present application, I employ generically these same features but instead of introducing the ignitable gases into a combustion space contained within the rotor drum, I introduce them into a combustion space at one end of the rotor and carried thereby, such combustion space leading directly into and through the high pressure rotor blades via the longitudinally and radially curved normal path of the motive fluid substantially coincident with the resultant of centrifugal force acting upon the force of the fluid and air continuously discharged under pressure into said combustion space. This, together with my devised method and means whereby said air and fluid are so discharged at an angle to each other, commingling and striking, and being diffused by a member within said combustion space, while said combustion space and the points of discharge of said air and fluid are relatively moved or rotated, each severally and jointly produce such turbulence of the combustion constituents as affords more complete combustion, produces greater rapidity of flame propagation, greater velocity of the combustion products delivered to the working surface of the turbine, substantial fuel economy and increased efficiency.

With the above and other objects which will hereinafter appear, my invention comprehends a novel combustion turbine operable under a substantially constant pressure created by the ignition, burning and expansion of fuel introduced into the combustion space whereby the kinetic energy is converted into rotative power and creates a rotative thrust on the rotor.

It further comprehends a novel method of and apparatus for circulating the cooling medium through the rotor shaft, the blad-ing, around the combustion chamber and all metal parts subjected to excessive high temperatures, in order to keep them below destructive temperatures.

It further comprehends a novel cooling method and means whereby the cooling medium is circulated through more than one set of blades of the rotor so that less heat will be absorbed by the cooling medium and still the metal will be maintained below destructive temperatures.

Other novel features of construction and advantage will hereinafter more fully appear in the detailed description and the appended claims.

For the purpose of illustrating my invention, I have shown in the accompanying drawings embodiments thereof which are at present preferred by me, since these embodiments will be found in practice to give more satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a top plan view of a combustion engine of the turbine type and its auxiliaries, embodying my invention, and illustrative of one form in which my invention may be practiced.

Figure 2 represents a side elevation of the engine.

Fig. 3 represents a separate sectional view of the rotor shown in Fig. 4;

Fig. 4 represents an enlarged sectional view taken substantially on section line 4—4 of Fig. 1.

Figure 5 represents, in side elevation and in detached position, a rotor blade.

Figure 6 represents, in front elevation, the blade seen in Figure 5.

Figure 7 represents a bottom plan view of the rotor blade.

Figure 8 represents, in sectional elevation, another type of first stage rotor wheel having gas tubes extending through the hollow shrouding used for circulating the cooling medium in and through the rotor blades.

Figure 9 represents a sectional view on line 9—9 of Fig. 8.

Figure 10 represents a longitudinal section showing an alternative method of circulating a cooling medium and gas passages through the rotor wheel and blades.

Figure 11 represents, in sectional elevation, another embodiment of my invention, showing an alternative method of passing the cooling medium through the rotor blade.

Similar numerals of reference indicate corresponding parts.

Referring to the drawings.

1 designates the supporting framework of a combustion turbine, embodying my invention, and by means of which my novel method can be carried out in practice. 2 designates the turbine casing and 3 the rotor shaft which is mounted in the stationary bearing 4 and the thrust and journal bearing 5. The rotor shaft is provided with a worm 6 which meshes with a worm gear 7 carried by the jack shaft 8 which latter is intergeared at 9 with the auxiliary shaft 10 which actuates the auxiliaries such as, for example, the electric generator 11, the lubricating pump 12, the fuel pump 13 and the cooling medium pump 14. The shaft 10 is preferably made in sections, and these sections are connected by couplings 15, see Figure 1. The jack shaft 8 is provided with a crank 16 which is operatively connected with a piston of an air compressor 17 which communicates by means of a discharge pipe 18 with an accumulator 19 from which leads an air line 20. A fuel line 21 leads from the fuel pump 13, and a line 22 for the lubricant leads from the lubricating pump 12 to the bearings and other desired portions of the turbine which are to be lubricated.

The cooling medium comes from the source of supply through the conduit 23 to the pump 14 and therefrom it passes through conduit 24 to the rotor, as will be hereinafter explained, and through the conduit 25, branching from conduit 24 to the lower chamber 26 of the turbine casing 2 see Figure 4. The cooling medium passes from the casing through the conduit 27, and from the rotor through the conduit 28 to the source of supply of the cooling medium.

The foregoing explains in a general way the construction and arrangement of the auxiliaries and their connections.

*The rotor and its adjuncts*

The rotor shaft 3 has rigidly secured thereto the hub 29 see Figures 3 and 4 which carries the high pressure rotor blades 30 and a rigidly secured hub 31 which carries the low pressure rotor blades 32. Any desired number of low pressure wheels or units may be employed. The rotor shaft carries an insulating sleeve 33 which is within the sleeve 34 which with the sleeve 33 revolves in unison with the rotor shaft 3. 35 designates the stationary ignition casing having a conical or tapered ignition chamber 36 therein at an angle to the axis of shaft 3 and with its restricted outlet opening into the mouth of said combustion chamber. The casing 35 is provided at its opposite ends with stuffing boxes 37, sealing against leakage the joints between said casing and chamber, see Figures 3 and 4; while to prevent leakage of the cooling medium from the turbine casing 2 through its joint with the projecting rotary end of the combustion chamber, said joint is provided with a stuffing box 38, see Figure 4.

39 designates an end clamping ring which is internally chambered to form a combustion chamber or space 40, the hub of which revolves within the juxtaposed stuffing box 37. The clamping ring 39 thus forms a casing in which is provided the combustion chamber 40. The clamping ring 39 is provided with the apertured annular flange 41 through which passes fastening bolts or devices 42, see Figure 3, which also pass through grooves 43 in the adjacent impinging surfaces of each of the high pressure rotor blades 30, see Figures 5 and 6, and also through a clamping ring 44 upon the opposite side of said blades 30. The co-operating faces of the clamping rings and rotor blades are provided respectively with coacting circular projections and recesses preferably inclined, as will be understood by reference to Figure 3, for example, so that there will be an inward drawing action upon each blade 30 when the clamping rings are brought together, so that the rotor blades will form a fluid tight joint with the rotor shaft and its hubs 29 and 31. A low pressure wheel, see Figure 3, has a clamping ring 45 on each side of its row of blades 32, the coacting faces of which, with their clamping devices, being constructed as heretofore described for parts 41, 42 and 30.

The high pressure rotor blades 30 are each divided by means of a diaphragm or baffle 46 to which is preferably connected a motive fluid tube 47 having a plurality of branches or nozzles, 48, 49 and 50 which form discharge nozzles. The tubes 47 open by ports 51, see Figures 3 and 10, into the combustion chamber 40. The high pressure rotor blades are preferably provided with a controllable cleaning aperture 52. The diaphragm 46 divides the high pressure rotor blade into the chambers 53 and 54 through which circulate the cooling medium and the diaphragm 46 terminates a desired distance below the tip of its blade.

55 designates the upper stator blades which are internally chambered, as at 56 see Figure 4, and are carried by a shrouding 57 which at its outer end is secured in recesses 58 in the casing 2. The low pressure rotor blades are open at their outer ends and communicate with the chamber 59 see Figure 3 of an outer annular shrouding 60 which interlocks with such rotor blades and is connected therewith by means of a clamping ring 61. The impacts and expansion of the high velocity gas exerted in the high pressure blading consumes but little of the kinetic energy of said gas and the residue of said energy, in the axial flow of said gas through the low pressure stator and rotor blades, acts thereon substantially similar to that of the steam turbine.

The rotor blades 32 form the second stage. The fuel line 21 discharges into the ignition chamber 36 and is controlled by a valve 62 having a spring to effect its closing, and its opening movement is controlled by a lever 63 which, in turn, is controlled by a conical cam 64 mounted on the jack shaft 8, see Figure 1. The manually actuated handle 65, which is adapted to be locked in any position to which it is moved, controls the position of said cam 64. The air line 20 discharges into the ignition chamber 36 and is controlled by a spring actuated valve 66, the opening movement of which is controlled by a lever 67 which is actuated by a conical cam 68 slidably mounted on shaft 8, and which can be set in any predetermined position by means of a manually actuated locking lever 69, similar to the lever 65. These cams 64 and 68 each have a conical contour so that, depending upon the position to which they are moved, their valves will be correspondingly opened or closed, and remain in their said set positions while their respective cams rotate. The ignition chamber 36 is provided with a hot plate 70 which is adapted to be electrically or otherwise heated.

The spent gases after leaving the blading pass into the chamber 71, and pass, by means of the conduits 72, see Figure 2, to the exhaust pump 161.

*The cooling system*

The cooling medium comes from the source of cooling supply through the conduit 23 to the pump 14, and, therefrom, through the branched conduits 24 and 25 respectively to the rotor elements and to the chamber 26 in the lower half of the turbine casing 2. The stator blades in the lower half are provided with the inlet ports 73 which open into the chamber 26 and the stator blades are internally chambered, as at 74, and open at their inner ends, as at 75, into the chambers 76 of their shrouding. The upper and lower halves of the shrouding communicate with each other so that said cooling medium circulates therethrough and into the chambers 56 of the upper stator blade into the upper chamber 77 and therefrom through the conduit 27 to the source of supply of the cooling medium. The cooling medium is circulated through the conduit 24 and the passage 78 to the hollow shaft 3 which latter is divided by means of a baffle 79 into an inlet passage 80 and an outlet passage 81, the cooling medium passing in the direction of the arrows, as shown in Figure 4.

The cooling medium inlet passage 80 of rotor shaft 3 communicates through a single port 82 opening into the annular groove or manifold 84, see Figure 3, extending completely around, and toward one side of, the high pressure hub 29, while the cooling medium outlet passage 81, of rotor shaft 3, communicates with a like groove or manifold 85, extending completely around and near the opposite side of said hub 29. Each high pressure blade 30 is provided with a semi-circular notch in the base thereof registering with each of said grooves or manifolds 84 and 85 for the purpose of enlarging their circulating capacity.

The cooling medium inlet passage 53, of each rotor blade 30 registers with a part of said inlet manifold 84 about hub 29, communicating with inlet port 82, while the cooling medium outlet side of each rotor blade 30 is prevented from communication therewith by the wall of said semi-circular passage in the base of each blade 30 registering with said inlet passage 53.

The cooling medium outlet side of each blade 30 discharges its cooling medium through its passages 54 into said outlet manifold 85, while the intake side of each blade 30 is prevented from any such premature or short-circuit discharge because it is provided with no such direct outlet.

Thus, the inlet cooling medium flows through single port 82 into manifold 84, extending around hub 29, thence entering each rotor blade inlet port 53, thence along one side of each blade 30 to the tips thereof, thence back along the other side of each blade 30 (said sides being each separated by a baffle wall 46) to outlet 54 where it enters said outlet manifold 85 and flows therein about said hub 29 until it reaches outlet port 83 and thence unto outlet passage 81 of shaft 3. The cooling medium from the passage 81 enters the discharge receptacle 87, see Figure 4, and passes therefrom through the conduit 28 to the source of supply of the cooling medium. The combustion chamber 40 is cooled by the cooling medium, since I provide the inlet port 88 which opens in the space between each port 51 into the cooling medium chamber 89 surrounding the combustion chamber 40. The cooling medium passes from the chamber 89 through the port 90 into the return passage 81 and therefrom to the source of supply of the cooling medium, as before explained.

The cooling medium for the low pressure rotor blades passes from the inlet channel 80 through the port 91 into the semicircular channel or manifold 92 which is blanked off at the ends and passes therefrom through the rotor blades 32 into the channel 59 in the shrouding 60, thence through the chamber in the rotor blade to the semicircular channel 93, and therefrom through the ports 94 to the return passage 81, as more fully described in my companion application Serial No. 631,310 filed April 11, 1923, which matured into Patent No. 1,723,515, and in connection with Figs. 11 and 12 thereof. It will thus be seen that the metal parts which are subjected to excessively high temperatures will be cooled to such an extent that they will be maintained below destructive temperatures.

The operation of my invention as thus far described is as follows:—

Assuming that the cooling medium source of supply is sufficient and that it is operating as just described, the operation for starting a small unit is as follows: The electric current is turned on to effect the heating of the hot plate 70. The air accumulator 19 is charged by a manually or otherwise operated air pump. The operator now actuates the fuel valve handle 65 and the air valve handle 69, so that an ignitible fuel is admitted into the ignition chamber 36 and at once becomes ignited and passes in the form of an incandescent flame into the combustion chamber 40 and therefrom directly through the motive fluid pipe of the rotor blades 30 of the first stage into the expansion space of the rotor.

The gases co-operate with the annular blading 86, see Figure 4, and with the stator blades 55, and then pass to the second stage of rotor blades 32, passing therefrom into the chamber 71 and to the exhaust pump 161. As soon as the engine is running normally, the current is cut off from the hot plate as the heat in the ignition chamber and combustion chamber is sufficient to effect the continuous ignition of the fuel, which is continuously fed under a constant pressure into the ignition chamber, so that there is always present in the combustion chamber a substantially constant volume of expanding gases which are under a constant pressure. If it is desired to vary the speed of the turbine, all that it is necessary to do is to adjust and regulate the fuel and air valves thereby enabling one to obtain the greatest economy and maximum efficiency. It will be apparent that after the engine is heated up the air can be admitted in larger quantities than has heretofore been deemed possible, thereby reducing to a minimum the amount of fuel consumed. As soon as the rotor shaft operates, it will be apparent that all of the auxiliaries will be driven, such as the lubricating oil pump, the cooling medium pump, the fuel pump, the electric generator, which charges the storage battery for the circuit of the hot plate, and also the air compressor which charges the accumulator.

In the embodiment seen in Figures 8 and 9 inclusive, I have shown another embodiment of my invention in which the high pressure rotor blades are connected with an outer shrouding through which the motive fluid pipe of the high pressure rotor blades extend. In this form of my invention, 95 designates the rotor blades which are secured in position in a similar manner to that already described for blades 30 except that the shrouding 96 is provided through which discharges the central nozzle 97 of the motive fluid pipe 98 which latter has the side branches 99 and 100. The shrouding 96 is provided on its outer periphery with the vanes 101 which extend in a direction opposite to the direction of rotation of the rotor. One of the main objects of the shrouding is to give the cooling medium as free a passage as possible, so that there is no chance for any of the passages accumulating sediment or foreign material. It will be seen that the rotor blades at their outer periphery have the ports 105 which open directly into the annular channel 106. In this form of rotor blades, a rotor wheel is divided into an upper and lower half by means of the bosses 107, and the high pressure rotor blades are simply internally chambered to permit the cooling medium to circulate freely therethrough into the chamber 106 and therefrom through the return passageway 81, as before explained, in connection with the other figures of the drawings, but more fully referred to in connection with ports 91 and 94 heretofore described.

The diaphragm 46 in the other form of my invention which separates each rotor blade into an inlet and outlet chamber is omitted in this form of my invention as shown in Figures 8 and 9. In this form of my invention, the fuel is continuously fed under a constant pressure to the ignition chamber as before explained and is passed in the form of an incandescent gas under a constant pressure and expansion through the motive fluid pipe of the high pressure nozzles or rotor blades into the expansion space of the rotor.

In the form of my invention shown in Figure 11, I have shown a circulating system in which the cooling action is progressive, the cooling medium being passed simultaneously to cool the walls of the rotating combustion chamber and the high pressure rotor, substantially as stated heretofore respecting Figures 3 and 4, then said thus heated cooling medium is passed to and through the second stage rotor member, where said cooling medium is further heated, and thence said cooling medium is passed to and through the third stage rotor members, where said cooling medium is further heated, it being apparent that any desired number of stages or rotor wheels may be employed and the cooling medium progressively fed from stage to stage in this manner so that it can be utilized to effect the cooling of more than one rotor wheel or the cooling of as many rotor wheels as may be desired. The temperature of each subsequent stage rotors is thus progressively maintained by the thus imparted surplus heat of each preceding stage, so that more power from the motive fluid is obtained in the succeeding stages due to the lesser heat exchange, thus attained, between said motive fluid and each of said subsequent stage rotors.

108 designates the rotor shaft which carries the rotor blades in the manner already described, and the cooling medium enters the hollow shaft 108 which is divided by the baffle 109 to form an inlet channel 110 which communicates with the cooling medium passages of the combustion chamber and of the first and second stages of the rotor blades, as hereinbefore explained and after circulating therethrough the cooling medium discharges into the cooling medium channel 111 from which it passes to the inlet port 112 of a succeeding stage, in which the rotor blades are provided with central diaphragms 113, so that the cooling medium will pass along one side of each rotor blade thereof to the peripheral portions of such blades and return through the opposite side of such blades to the ports 114, thence to the discharge passage 115, this latter passage leading back to the source of cooling medium supply. Rigid with, and extending from the inner end of, baffle 109, is a round rod 109a having a piston 109b secured upon its inner end at a point between said ports 112 and 114, said piston stopping the flow of the cooling medium in the adjacent portions 111 and 115 of the bore of shaft 108 except around said piston by the paths above described including said ports 112 and 114. The flow of the cooling medium is clearly shown by the arrows in Figure 11 and the other parts with which the turbine co-operates will be readily understood by reference to other figures of the drawings.

It will now be apparent that I obtain in the combustion turbine herein disclosed a constant pressure which is created by the instantaneous ignition, burning and expansion of the ignitible fuel introduced into a combustion space which is always maintained at a high temperature and from which it is led directly into the expansion spaces of the turbine to cause the kinetic energy of the incandescent gases to be converted into rotative power.

The object of compounding or progressively using the cooling medium a plurality of times in the circulation is to maintain the cooling medium at a high temperature while the temperature of the gases is decreasing and is still below that which would be destructive to the blading. This prevents the cooling medium absorbing an undesired quantity of heat units from the gases during the time such gases are exerting their kinetic energy on the low pressure blading. This tends to largely increase the efficiency of the turbine. The circulation of the cooling medium is greatly facilitated by the thermosyphonic action.

In my co-pending application referred to, the combustion chamber is formed in a rotor drum, while in my present application, the combustion chamber is formed in one of the clamping heads connected with the rotor and the incandescent gases combust and expand longitudinally and radially in substantially the normal path of the resultant of the motive fluid and air pressures and of centrifugal force in the laterally disposed combustion chamber, whose interior shape conforms substantially to said path, whereby the motive fluid is caused to flow in said path at an accelerated high and unimpeded velocity directly through the nozzle or high pressure rotor blades into the expansion space of the turbine.

The form of the fuel nozzles and the curvature of the blading is such as to give the best results, so that all of the kinetic energy of the gases can be employed to exert a rotative thrust on the rotor continuously.

In the embodiment seen in Figure 10, I have shown another form of cooling system and of the turbine shaft which is somewhat different from that seen in Figures 3, 4 and 11 and in which the rotor shaft 116 is provided with a baffle 117 which divides the hollow of the shaft into an inlet passage 118 and an outlet passage 119. The cooling medium coming from the pump passes into the receptacle 120 through the port 121, such feed being facilitated by the scoop 122 fixed to the rotor shaft. Scoop 122 comprises a lip shaped projection extending tangentially from the shaft. Said projection 122 functions as an impeller blade of a rotary pump. The cooling medium passes through the port 123 to the annular groove or manifold 124a and thence through the low pressure blading 32 into the channel 59 of the shrouding 60 and thence through the low pressure rotor blading in the opposite half of the rotor, as heretofore described, and thence through the port 124 into the return passage 119. The cooling medium passes from the inlet passage 118 through the port 125 into the annular groove 126 and therefrom through the high pressure rotor blading of the rotor wheel, and therefrom through the channels 127 and port 128 into the return passage 119 which leads to the discharge resceptacle 129, and therefrom to the source of supply of the cooling medium. The combustion chamber is cooled by the cooling medium passing from the passage 118 to the port 130 into the chamber 89, and from said chamber through the port 131 into the return passage or channel 119. It will be seen that the hubs 29 and 31 are provided respectively with annular grooves or manifolds 126, 127 and 124a communicating with their respective blading and with their respective ports.

The maintenance to substantial working temperatures within combustion turbines, and the control of such temperature well below the degree of heat deterioration of the parts, are each of vital importance in the construction and operation of the useful and efficient turbine, which my invention maintains and controls most practically and efficiently.

In each of the secondary expansion stage rotors my invention maintains and controls said high working temperature by transferring thereto a substantial part of the surplus heat arising in the primary stage rotor, said heat transfer being attained, specifically in the instance shown in the drawings, by the circulation of the cooling medium through the primary rotor and thence successively through each secondary rotor, whereby I attain greater motive power from the motive fluid acting upon said secondary rotors, by lessening the heat transfer from such motive fluid to the parts comprising each secondary rotor. This heat interchange enables the employment of a greater number of secondary stage rotors than was possible efficiently before my invention.

It will now be apparent that I have devised a new and useful combustion turbine and methods of burning fuel which embodies the features of advantage enumerated as desirable in the statement of the invention and the above description, and while I have, in the present instance, shown and described embodiments thereof which will give in practice satisfactory and reliable results, it is to be understood that these embodiments are susceptible of modification in various particulars without departing from the spirit or scope of the invention or sacrificing any of its advantages.

By the employment of the exhaust fan 161 for constant pressure combustion turbines, I accomplish a greater conversion of heat of the motive fluid into useful power than that which is required to operate said fan, due to the partial vacuum, produced by the fan, causing a greater expansion and conversion of the temperature and velocity of the combusted products into useful work.

My improved method not only requires substantial heat, but may be practiced by many of the different forms of apparatus with or without substantial modification. The understanding of my invention by those skilled in the art, and of the improved type of apparatus I have devised for obtaining the most commercial benefit of my method, will serve as an example of the facility with which my invention may be practiced with more or less commercial benefit by the employment of heat and other types of apparatus.

The method and the improved apparatus, by which the same may be most advantageously practiced, are related and interdependent inventions.

The invention herein described may be manufactured and used by and for the Government of the United States for governmental purposes without the payment to me of any royalty thereon or therefor.

Having thus described my invention, what I claim as new and desire to secure by Letters Patent, is:—

1. In a combustion turbine, a plurality of combustion chambers, each at an angle to one of said chambers, means for relatively moving said chambers, means of communication between said chambers, means for admitting air and fuel into one of said chambers, and means for igniting said fuel.

2. In a combustion turbine, a plurality of combustion chambers, each at an angle to one of said chambers, means for relatively moving said chambers, means of communication between said chambers, means for sealing the inlet to the initial one of said chambers, means for admitting air and fuel into said initial chamber, and means for igniting said fuel.

3. In a combustion turbine, a combustion chamber, primary and secondary expansion means, means for supplying a cooling medium, and means for passing said medium initially to cool said chamber and said primary means, and means for thence passing said cooling medium successively through each secondary expansion means.

4. In a combustion turbine, having primary and secondary stages, and means whereby a substantial working temperature is maintained and controlled in the combustion products within, and the working parts comprising, said stages, by the transfer of radiation heat successively from stage to stage toward the exhausting point.

5. The method of operating a multiple stage combustion turbine including the step comprising the maintenance and control of substantial working temperature of the combustion products within, and the working parts comprising, each stage after the first stage by preventing substantial heat transfer from said products to working parts in each stage succeeding the first stage.

CHARLES N. KOCH.